United States Patent
Py et al.

(10) Patent No.: US 6,305,186 B1
(45) Date of Patent: Oct. 23, 2001

(54) PROCESS OF MANAGEMENT OF A THERMOCHEMICAL REACTION OR OF A SOLID-GAS ADSORPTION

(75) Inventors: Xavier Py, Canohes; Francis Kindbeiter, Perpignan, both of (FR)

(73) Assignee: Centre National de la Recherche Scientifique (FR)

( * ) Notice: Subject to any disclaimer, the term of this patent is extended or adjusted under 35 U.S.C. 154(b) by 0 days.

(21) Appl. No.: 09/601,410

(22) PCT Filed: Feb. 2, 1999

(86) PCT No.: PCT/FR99/00213

§ 371 Date: Aug. 29, 2000

§ 102(e) Date: Aug. 29, 2000

(87) PCT Pub. No.: WO99/40380

PCT Pub. Date: Aug. 12, 1999

(30) Foreign Application Priority Data

Feb. 3, 1998 (FR) .................................................. 98 01236

(51) Int. Cl.[7] ...................................................... F25B 17/08
(52) U.S. Cl. ......................... 62/480; 62/106; 165/104.12
(58) Field of Search ............................... 62/480, 481, 106, 62/112, 114, 324.1; 165/104.12, 104.16

(56) References Cited

U.S. PATENT DOCUMENTS

| 4,346,752 | * | 8/1982 | Kesten et al. | 165/104.12 |
| 4,993,239 | * | 2/1991 | Steidl et al. | 62/480 |
| 5,056,591 | * | 10/1991 | Spinner et al. | 165/104.16 |
| 5,661,986 | * | 9/1997 | Labranque | 62/480 |
| 5,666,819 | * | 9/1997 | Rockenfeller et al. | 62/480 |
| 5,816,069 | * | 10/1998 | Ebbeson | 62/480 X |

FOREIGN PATENT DOCUMENTS

| 549 343 | 4/1932 | (DE) . |
| 652 823 | 3/1929 | (FR) . |
| 751 102 | 8/1933 | (FR) . |

* cited by examiner

Primary Examiner—Henry Bennett
Assistant Examiner—Chen-Wen Jiang
(74) Attorney, Agent, or Firm—Burns, Doane, Swecker & Mathis, L.L.P.

(57) ABSTRACT

The invention concerns a method for controlling a thermochemical reaction or a solid-gas adsorption being carried out in a reactor (10) containing an active agent capable of reversibly reacting with a gas, the reactor (10) being connected to an evaporator/condenser assembly (14) for the gas by a connection (12) without control valve, the reactor (10) and the evaporator/condenser assembly (14) each provided with means for selectively exchanging calories with their surroundings. The control method consists in: thermally insulating the reactor (10) and the evaporator/condenser assembly (14) from the surroundings; thermally communicating the reactor (10) with its surroundings so that the active agent reacts with the gas, thereby providing cold to the evaporator (14); thermally communicating the evaporator (14) with its surroundings so as to cool it selectively; and selectively insulating the reactor (10) or the evaporator/condenser assembly (14) from their surroundings so as to stop the reaction at one point of the reversible cycle.

10 Claims, 2 Drawing Sheets

PROCESS OF MANAGEMENT OF A THERMOCHEMICAL REACTION OR OF A SOLID-GAS ADSORPTION

BACKGROUND OF THE INVENTION

1. Field of the Invention

The present invention relates to a process of management of a thermochemical reaction or of a solid-gas adsorption permitting the production of cold and/or of heat.

2. Description of the Related Art

A thermochemical reaction, or an adsorption, is based on a reversible reaction between a solid and a gas, and can be schematized by the equation:

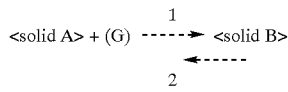

In the reactor, the reaction is exothermic in the direction 1, which means that it produces heat, and it is endothermic in the direction 2. In the direction 1, it likewise produces cold in the associated evaporator by the evaporation of the gas (G).

Such a system permits the storage of energy in a chemical or physical form, and has varied fields of application.

In a conventional manner, this type of thermochemical or adsorption reaction is located in a system comprising an enclosure, termed a "reactor", containing a salt or an adsorbent and, preferably, an expanded binder which is a good conductor of heat. The reactor is arranged so as to be capable of being selectively placed in communication with a second enclosure forming an evaporator/condenser assembly for the gas intended to react with the salt. This communication is effected by a duct provided with a control valve. During a conventional cycle of reaction or of adsorption, the valve is open, permitting the gas present in liquid form in the evaporator to be evaporated and to pass through the duct in order to react with the salt or the adsorbent present in the reactor, resulting in the cooling of the evaporator. At the end of the evaporation phase, the salt or the adsorbent in the reactor is heated, for example by means of an electrical resistance, thus causing the discharge of the gas toward the condenser. The control valve permits stopping the reaction cycle at any moment.

In order to permit a continuous production of cold and/or of heat, two analogous sub-assemblies can be placed side by side, one producing cold and/or heat while the other is in a regeneration phase.

An example of a thermochemical system of this type, having two sub-assemblies, is described in the document EP-A-0 382 586. In this system, the evaporator/condenser assembly of each sub-assembly comprises a reactor able to absorb or desorb the gas. The ducts connecting the reactors are each provided with a control valve for the passage of gas. The control valves form the sole means of setting in operation or of stopping the thermochemical reaction or the adsorption/desorption.

The use of control valves in the ducts connecting the reactors has two disadvantages.

Each valve requires an associated actuation for opening or closing it, and this increases the cost and/or the complexity of the system. But in addition, the presence of valves increases the risk of leaks of gas from the system. This risk of leaks of gas, for example of ammonia, reduces the number of practical applications of this type of thermochemical system.

SUMMARY OF THE INVENTION

The present invention thus has as its object a process of management of a thermochemical reaction or of an adsorption/desorption which does not require the presence of any control valve in the thermochemical system.

In the case in which a thermochemical system is intended to produce cold, it comprises for this purpose a single reactor connected to an evaporator/condenser assembly. If, when this system is in a phase of production of cold, the reaction is stopped by closing a control valve, the temperature of the evaporator will tend to increase due to the effect of the ambient air while the reaction is stopped. Then, when the reaction is restarted by reopening the valve, there is a time during which the thermochemical reaction only serves to reduce the temperature of the evaporator down to its level before the stop. The energy of the thermochemical reaction is thus lost during this phase.

The present invention has as its second object a process of management of a thermochemical reaction which ensures that, during each stop, the temperature of the evaporator substantially does not vary, or varies solely in a favorable manner.

In order to attain these objects, the present invention proposes a process of management of a thermochemical reaction or of a solid-gas adsorption located in a reactor containing a reactive agent able to react in a reversible manner with a gas, the reactor being connected, by a connection devoid of a control valve, to an evaporator/condenser assembly for the gas, the reactor and the evaporator/condenser assembly each being provided with means permitting selective exchange of calories with the environment, characterized in that the process of management comprises the steps consisting of:

thermally isolating the reactor and the evaporator/condenser assembly from their environment;

placing the reactor in thermal communication with its environment in order for the active agent to react with the gas, with the production of cold at the evaporator;

placing the evaporator in thermal communication with its environment in order to selectively cool the latter; and selectively isolating the reactor or the evaporator/condenser assembly from their environment in order to stop the reaction at a point of the reversible cycle.

BRIEF DESCRIPTION OF THE FIGURES OF THE DRAWING

The advantages, as well as the operation, of the present invention will become apparent more clearly on reading the following description, with reference to the accompanying drawings in which.

DETAILED DESCRIPTION OF THE PREFERRED EMBODIMENTS

Figure 1:
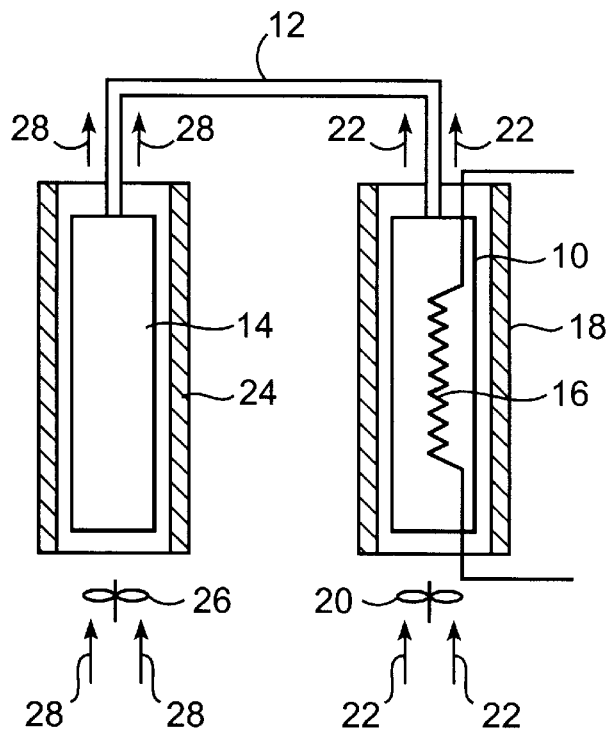
FIG. 1 is a schematic view of a thermochemical system permitting the embodiment of the process according to the invention.

As shown in FIG. 1, a thermochemical system comprises a reactor 10 intended to contain an active agent capable of reacting in a reversible manner with a gas. Preferably, the active agent comprises a salt, the gas being ammonia. In a preferred embodiment, the salt is dispersed in a binder comprising expanded graphite, which may be recompressed. The reactor 10 is connected via a duct 12 to an evaporator/condenser assembly 14. Furthermore, the reactor is provided with a reheating means 16 intended to permit the thermochemical reaction between the salt and the gas to proceed in the direction of a regeneration. Preferably, the reheating means comprises an electrical resistance. A sleeve 18 of thermally insulating material is disposed around the reactor 10. The ends of the sleeve 18 are open, thus permitting air, blown by a fan 20, to pass around the reactor 10 in the direction of the arrows 22. A sleeve 24, likewise of an insulating material, is disposed around the evaporator/condenser assembly and has open ends, analogously permitting air, blown by a fan 26, to pass around the assembly in the direction of the arrows 28.

According to a first aspect of the invention, the duct 12 is not provided with a control valve, the passage between the reactor 10 and the evaporator/condenser being permanently open.

The process of management of the thermochemical reaction, located in the system of FIG. 1, will now be described.

Figure 2:
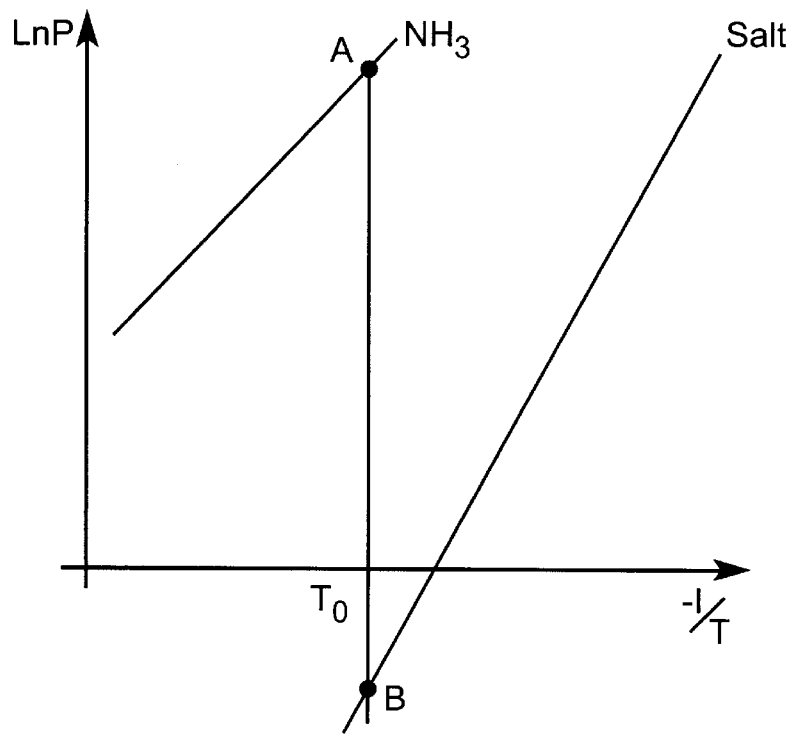
FIGS. 2–4 each show a Clapeyron diagram illustrating a phase of the process according to the invention, in the case of univariant reactions at equilibrium.
Figure 3:
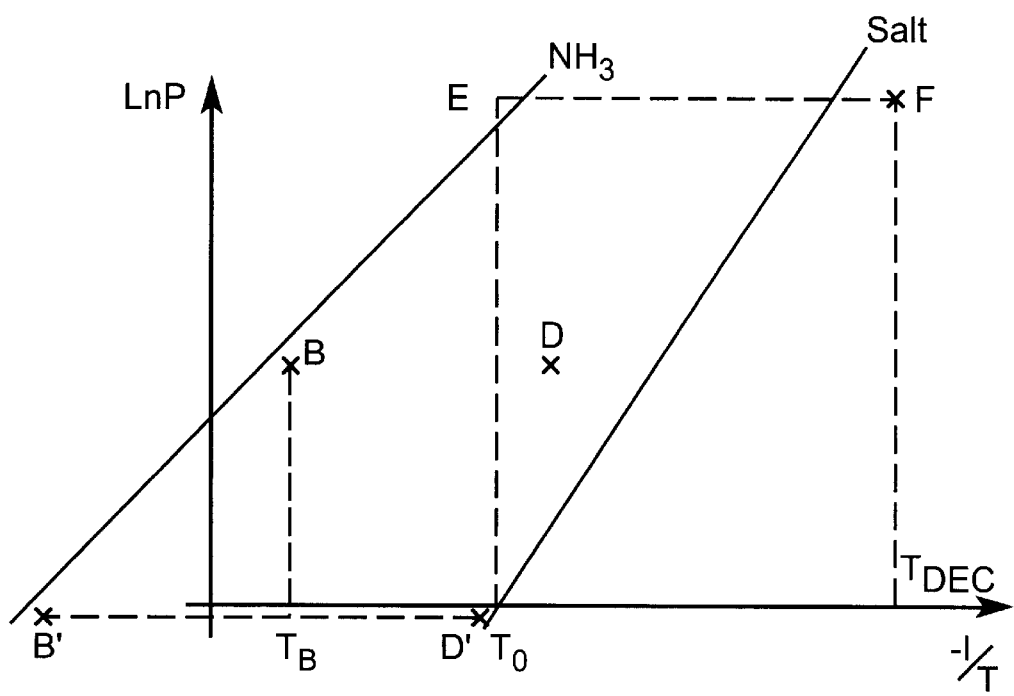

In the Clapeyron diagram of FIG. 2, there are shown the equilibrium straight lines of the univariant liquid-gas transformations of ammonia, labeled $NH_3$, and univariant solid-gas transformations of a salt, labeled "salt", which reacts with ammonia. If the two elements 10 and 14 of FIG. 1 were separated by a valve placed in the duct 12, the equilibrium pressure and temperature of these two elements at ambient temperature $T_0$ would be those defined at A and B respectively. Considering the case in which the duct 12 is not provided with a control valve and in which the system has just produced cold at the temperature $T_B$ (see FIG. 3), the evaporator is situated at the point B and the reactor is located at the point D, with a separation with respect to the equilibrium straight line of the salt. Toward the end of the thermochemical reaction, when all the ammonia has reacted with the salt, the pressure in the system is set by the reactor. Thus the pressure of the system will fall toward the point D', the evaporator tending toward the point B'.

When it is desired to regenerate the system, the desired temperature $T_{DEC}$ at the reactor is set, bringing about a rise of pressure to permit the decomposition of the salt, ammonia being discharged toward the condenser which is then at the point E, the reactor being situated at the point F.

Figure 4:
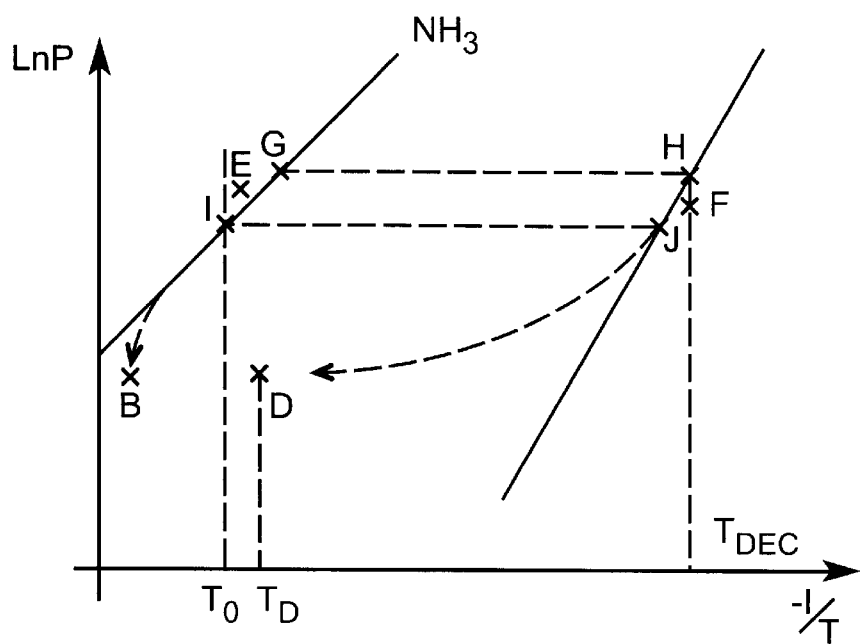

At the end of the regeneration phase, equilibrium is reached, bringing about a rise of the pressure of the system which comes to be stabilized at the points G for the condenser and H for the reactor, as long as the reactor is at the temperature $T_{DEC}$ (see FIG. 4).

When it is desired to produce cold at the evaporator, it is sufficient to stop maintaining the reactor temperature at $T_{DEC}$. When this temperature is no longer maintained, the system begins to cool. The evaporator and the reactor respectively follow the paths GI and HJ, the point I corresponding to the equilibrium of the evaporator at the temperature $T_0$.

As the reactor continues to cool, the temperature $T_J$ of the point J being greater than $T_0$, there follows a fall of the pressure of the system, leading the reservoir to pass below $T_0$, and thus to produce cold. The evaporator will produce cold at the point B, with a deviation with respect to the equilibrium straight line, and the reactor tends toward the point D. The positions B and D depend on the nature of the heat exchanges associated with the evaporator and with the reactor, and thus on the exchanged heat flows. At the end of this phase of production of cold, in which the salt contained within the reactor is deprived of ammonia, the system is situated at its starting point, shown in FIG. 3.

In order for the thermochemical system of FIG. 1 to be able to follow the reaction cycle described hereinabove, without having a control valve in the duct 12 connecting the reactor 10 to the evaporator/condenser assembly, a management process is carried out according to the present invention.

As the reactor 10 and the evaporator/condenser assembly 14 are substantially isolated from the ambient air by their respective sleeves 18, 24, the exchange of calories can be managed by selectively passing a current of air within the sleeves by means of the fans 20 and 26. If the exchange of calories is prevented, the thermochemical reaction will either stop, or proceed very slowly.

For example, if it is desired to vary the production of cold, after passing from the points GH to the points BD in the operating cycle described hereinabove, it is sufficient to control the fan 26 in order to control the exchange of calories between the evaporator and the air. If the ventilation is interrupted, it will lead to the paths of the evaporator from the point B toward the equilibrium straight line at B' and of the reactor from the point D toward the equilibrium at the temperature $T_0$, that is, the point D'. The points B' and D' correspond to positionings which are slightly out of equilibrium, these deviations bringing about a very slight evaporation and/or synthesis reaction whereby the production of cold and the production of heat are only possible by losses through the insulation of the elements 10 and 14. When it is again desired to produce cold, starting the fan again brings the system back to the points B and D.

In an analogous manner, when the system is in the regeneration phase, during which phase ammonia is condensed in the evaporator/condenser assembly, the heat of condensation can be selectively withdrawn by starting the fan 28. As in the preceding example, if the ventilation is interrupted, the condenser, no longer able to release its heat of condensation, stops the thermochemical reaction.

In the two preceding examples, when the reaction is stopped by preventing the system exchanging calories with the ambient air, the fact that the duct remains open between the reactor and the evaporator/condenser assembly has the result that the thermochemical reaction proceeds, albeit very slowly. The reaction thus tends to compensate solely for the calories lost by the system through the insulation of the sleeves. The temperatures of the reactor and of the evaporator/condenser assembly thus tend to remain constant.

The process of management according to the invention permits the reaction to be stopped at a predetermined point of the cycle during a given time, with the reaction consuming only the small quantity of ammonia necessary to compensate the thermal losses. Also, the system can be maintained at a given point of its cycle, the cycle being able to restart at any moment simply by setting one or both of the fans in operation. This waiting period consumes only a little ammonia.

Thus, by selectively heating the reactor and/or by controlling the exchange of calories between the reactor or the evaporator/condenser assembly and the ambient air, the thermochemical reaction can be managed in a system in which the duct for the gas remains permanently open.

Instead of the insulating sleeve, a sheath of insulating material can be used, disposed in contact with the exterior surface of the reactor. Instead of providing fans, it would be sufficient to withdraw the sheath from the reactor, in order to expose it to the ambient air. The rate of cooling of the reactor would be a function of its surface area exposed to the ambient air. In an alternative manner, the reactor can be disposed in a closed, insulating enclosure such as a Dewar vessel. In this case, the reaction takes place very slowly, solely compensating for the calories lost through the insulating wall.

When the reaction takes place intermittently, the stopped periods can be made use of to regenerate the reaction, even if the reaction has not been completely terminated. In this manner, a continuous system is approached in which there is no long regeneration time.

The insulating sleeves 18 and 24 can likewise be arranged to make them into chimneys with draft, which do not require fans but operate solely by convection. In this case, the sleeves are advantageously provided with valves or shutters in order to be able to close them selectively, thus stopping the exchange of calories with the ambient air during the regeneration phase. The natural convection in the chimney around the reactor can be made use of to produce a small quantity of cold at the evaporator during a long period.

To complete the description hereinabove, an embodiment example of the process according to the invention is given hereinafter, but no limitation is thereby implied.

EXAMPLE

In order to cool an insulated enclosure having a volume of 80 liters, the ambient temperature being 26° C., a reactor is disposed around the enclosure, the said reactor having a volume of 4 liters and containing 460 g of $MnCl_2$ mixed with 260 g of expanded graphite. The evaporator contains 250 g of $NH_3$. The air within the enclosure is recirculated over the evaporator by fans. A bulb placed within the enclosure controls the starting and stopping of the fans associated with the evaporator and the reactor, with respect to a reference temperature. When the temperature of the enclosure exceeds the reference temperature, the fans are supplied with power, the reactor starts to react, and the enclosure is cooled. When the temperature of the enclosure is again below the reference temperature, the fans are stopped. During the operating cycle, the fans are started every 12 minutes for a period of 5.6 minutes.

The evaporator/condenser assembly can be replaced by a second reactor containing another salt or another mixture of salts.

Management analogous to that described hereinabove can likewise be applied to a thermochemical system which is intended to produce heat. In this case, the heat is used which is produced at the temperature $T_D$, greater than the temperature $T_0$, the evaporator drawing the necessary thermal energy from the ambient air.

The process of management according to the invention is thus applied to thermochemical reactions, and to solid=gas adsorptions, but likewise to liquid-gas absorptions.

What is claimed is:
1. Process of management of a thermochemical reaction or of a solid-gas adsorption located in a reactor containing a reactive agent able to react in a reversible manner with a gas, the reactor being connected, by a connection devoid of a control valve, to an evaporator/condenser assembly for the gas, the reactor and the evaporator/condenser each being provided with means permitting selective exchange of calories with the environment, characterized in that the process of management comprises the steps consisting of:
    thermally isolating the reactor and the evaporator/condenser assembly from their environment;
    placing the reactor in thermal communication with its environment in order for the active agent to react with the gas, with the production of cold at the evaporator;
    placing the evaporator in thermal communication with its environment in order to selectively cool the latter; the process being characterized in that it comprises the step of isolating, selectively, solely the evaporator/condenser assembly from its environment in order to stop the reaction at a point of the reversible cycle.
2. Process according to claim 1, characterized in that the steps of placing the evaporator or the reactor in thermal communication with its environment takes place by convection.
3. Process according to claim 2, characterized in that the steps of placing the evaporator or the reactor in thermal communication with its environment take place by a circulation of air.
4. Process according to claim 3, characterized in that a thermochemical reaction is set in operation between a salt and a gas, particularly ammonia, the salt being dispersed in a binder comprising expanded graphite.
5. Process according to claim 2, characterized in that a thermochemical reaction is set in operation between a salt and a gas, particularly ammonia, the salt being dispersed in a binder comprising expanded graphite.
6. Process according to claim 1, characterized in that the steps of placing the evaporator or the reactor in thermal communication with its environment take place by a circulation of air.
7. Process according to claim 6, characterized in that the air is circulated by means of fans.
8. Process according to claim 7, characterized in that a thermochemical reaction is set in operation between a salt and a gas, particularly ammonia, the salt being dispersed in a binder comprising expanded graphite.
9. Process according to claim 6, characterized in that a thermochemical reaction is set in operation between a salt and a gas, particularly ammonia, the salt being dispersed in a binder comprising expanded graphite.
10. Process according to claim 1, characterized in that a thermochemical reaction is set in operation between a salt and a gas, particularly ammonia, the salt being dispersed in a binder comprising expanded graphite.

* * * * *